US012110720B2

(12) United States Patent
Kraus et al.

(10) Patent No.: US 12,110,720 B2
(45) Date of Patent: Oct. 8, 2024

(54) VEHICLE DOOR INCLUDING PUSH BUTTON ACTUATOR

(71) Applicant: REV Ambulance Group Orlando, Inc., Winter Park, FL (US)

(72) Inventors: Kevin Thomas Kraus, Orlando, FL (US); Nathan Ray Dockendorf, Elma, IA (US); Bryson Jay Nebeker, Orlando, FL (US)

(73) Assignee: REV Ambulance Group Orlando, Inc., Winter Park, FL (US)

( * ) Notice: Subject to any disclaimer, the term of this patent is extended or adjusted under 35 U.S.C. 154(b) by 126 days.

(21) Appl. No.: 17/577,623

(22) Filed: Jan. 18, 2022

(65) Prior Publication Data

US 2022/0235590 A1 Jul. 28, 2022

Related U.S. Application Data

(60) Provisional application No. 63/141,517, filed on Jan. 26, 2021.

(51) Int. Cl.
*E05C 9/10* (2006.01)
*E05B 1/00* (2006.01)
(Continued)

(52) U.S. Cl.
CPC ................ *E05C 9/10* (2013.01); *E05C 9/046* (2013.01); *E05C 9/1891* (2013.01);
(Continued)

(58) Field of Classification Search
CPC .......... E05C 9/10; E05C 9/046; E05C 9/1891; E05C 3/08; E05C 3/162; E05C 1/14;
(Continued)

(56) References Cited

U.S. PATENT DOCUMENTS 502,789 A * 8/1893 Tobey ...................... E05B 85/22 292/164
508,361 A * 11/1893 Young ................. E05B 17/0025 292/64

(Continued)

FOREIGN PATENT DOCUMENTS

DE 202012007145 U1 * 12/2013 ........... E05B 1/0038
EP 1898035 A2 3/2008
EP 2821571 A1 * 1/2015 ........... E05B 1/0038

OTHER PUBLICATIONS

Horton Emergency Vehicles, "State of Ohio STS 233X Ambulance Pricing—Horton Emergency Vehicles," 2013, Rev. 2.2 (25 pages).

(Continued)

*Primary Examiner* — Christine M Mills
*Assistant Examiner* — Faria F Ahmad
(74) *Attorney, Agent, or Firm* — Michael Best & Friedrich LLP

(57) ABSTRACT

A door of a vehicle includes a door body coupled to a vehicle body. The door body is movable relative to the vehicle body between an open position and a closed position. The door further includes a latch movable relative to the door body between a latched position and an unlatched position. The latch is configured to secure the door body in the closed position when the latch in the latched position. An actuator is supported by the door body and operable to move the latch from the latched position to the unlatched position, and a push button actuator is supported by the door body and operable to move the latch from the unlatched position to the latched position. The push button actuator is operable to move the latch from the latched position to the unlatched position without operating the actuator.

16 Claims, 14 Drawing Sheets

(51) Int. Cl.

| | |
|---|---|
| ***E05B 83/26*** | (2014.01) |
| ***E05C 9/04*** | (2006.01) |
| ***E05C 9/18*** | (2006.01) |

(52) U.S. Cl.
CPC ............. *E05B 1/0038* (2013.01); *E05B 83/26* (2013.01); *Y10S 292/37* (2013.01)

(58) Field of Classification Search
CPC ...... Y10S 292/37; E05B 1/0038; E05B 83/26; E05B 81/90; E05B 85/12; Y10T 292/65; Y10T 292/0822; Y10T 292/0908; Y10T 292/57
See application file for complete search history.

(56) References Cited

U.S. PATENT DOCUMENTS

| | | | | | |
|---|---|---|---|---|---|
| 567,063 | A * | 9/1896 | Alfors | E05B 55/00 | 70/156 |
| 767,567 | A * | 8/1904 | Keil | E05C 3/30 | 292/108 |
| 1,127,721 | A * | 2/1915 | Bazille | E05B 85/22 | 292/173 |
| 1,184,498 | A * | 5/1916 | Wells | E05B 85/24 | 292/341.17 |
| 1,199,849 | A * | 10/1916 | Willoughby | B61D 23/02 | 105/434 |
| 1,316,595 | A * | 9/1919 | Rehdorf | E05B 85/243 | 292/216 |
| 1,324,428 | A * | 12/1919 | Mair | E05C 3/12 | 292/237 |
| 1,655,730 | A * | 1/1928 | Lieberman | E05C 9/06 | 292/36 |
| 1,671,249 | A * | 5/1928 | Lieberman | E05C 9/048 | 70/118 |
| 2,051,132 | A * | 8/1936 | Dart | F25D 23/025 | 16/326 |
| 2,222,553 | A * | 11/1940 | Raymond | E05B 77/46 | 292/DIG. 3 |
| 2,233,699 | A * | 3/1941 | Gorrell | E05B 65/0014 | 292/53 |
| 2,608,428 | A * | 8/1952 | Allen | E05B 83/16 | 292/216 |
| 2,729,089 | A * | 1/1956 | Pelcin | E05B 47/0002 | 70/151 R |
| 2,738,212 | A * | 3/1956 | Wise | E05B 85/28 | 292/DIG. 26 |
| 3,975,934 | A * | 8/1976 | Babai | E05C 9/10 | 70/120 |
| 4,288,944 | A * | 9/1981 | Donovan | E05C 9/042 | 70/276 |
| 4,470,277 | A * | 9/1984 | Uyeda | E05B 65/0075 | 70/284 |
| 4,505,500 | A * | 3/1985 | Utsumi | E05B 85/243 | 292/DIG. 3 |
| 4,630,852 | A * | 12/1986 | White | E05C 19/06 | 292/87 |
| 4,917,412 | A * | 4/1990 | Swan | E05B 77/265 | 292/216 |
| 5,056,847 | A | 10/1991 | Stillwell et al. | | |
| 5,180,201 | A * | 1/1993 | Hauber | E05B 63/0069 | 292/336.3 |
| 5,308,126 | A * | 5/1994 | Weger, Jr. | E05C 9/043 | 292/DIG. 60 |
| 5,378,036 | A | 1/1995 | Townsend | | |
| 5,532,521 | A | 7/1996 | Leininger | | |
| 6,018,292 | A | 1/2000 | Penny, Jr. | | |
| 6,145,897 | A | 11/2000 | Locher | | |
| 6,427,500 | B1 * | 8/2002 | Weinerman | E05B 79/20 | 296/100.1 |
| 6,713,703 | B1 | 3/2004 | Roza | | |
| 6,783,167 | B2 * | 8/2004 | Bingle | E05B 83/26 | 292/DIG. 43 |
| 7,417,395 | B2 | 8/2008 | Edwards et al. | | |
| 7,703,835 | B2 | 4/2010 | Weeda et al. | | |
| 7,823,933 | B2 * | 11/2010 | Layos | E05B 53/00 | 292/37 |
| 7,967,347 | B1 | 6/2011 | Johnson | | |
| 8,217,755 | B2 | 7/2012 | Martin et al. | | |
| 8,844,982 | B2 * | 9/2014 | Weinerman | F41H 5/226 | 292/137 |
| 8,959,838 | B1 | 2/2015 | Marinelli | | |
| 9,045,919 | B2 | 6/2015 | Aragon et al. | | |
| 9,861,847 | B2 | 1/2018 | Mcloughlin | | |
| 9,909,347 | B2 | 3/2018 | Warburton et al. | | |
| 10,240,386 | B2 | 3/2019 | Wise | | |
| 10,246,911 | B2 | 4/2019 | Marasco | | |
| 10,808,424 | B2 * | 10/2020 | Criddle | E05B 47/02 | |
| 2004/0123636 | A1 * | 7/2004 | Linares | E05B 63/143 | 70/159 |
| 2005/0077734 | A1 * | 4/2005 | Lim | E05B 83/26 | 292/216 |
| 2006/0005589 | A1 * | 1/2006 | Hanjono | B60R 7/06 | 70/208 |
| 2006/0082161 | A1 * | 4/2006 | Minix | E05B 13/10 | 292/28 |
| 2007/0241107 | A1 * | 10/2007 | Matsumoto | B65D 45/327 | 220/238 |
| 2008/0202910 | A1 * | 8/2008 | Lutzke | H01H 3/3031 | 200/325 |
| 2009/0108595 | A1 * | 4/2009 | De Vries | E05B 13/101 | 292/214 |
| 2011/0112689 | A1 * | 5/2011 | Riegelman | E05B 85/12 | 49/502 |
| 2013/0067817 | A1 | 3/2013 | Sorensen | | |
| 2013/0238187 | A1 * | 9/2013 | Zysk | E05B 81/56 | 701/36 |
| 2014/0373453 | A1 | 12/2014 | Lee | | |
| 2019/0234118 | A1 * | 8/2019 | Krishnan | E05B 83/34 | |
| 2019/0234119 | A1 * | 8/2019 | Miwa | E05B 83/26 | |
| 2019/0338568 | A1 * | 11/2019 | Klein | E05B 81/16 | |
| 2021/0237804 | A1 * | 8/2021 | Gillis | E05B 77/54 | |

OTHER PUBLICATIONS

Mercedes-Benz, "Trunk emergency release," <http://www.mersag.com/cmer-527.html> web page visited Dec. 13, 2020 (3 pages).
Trimark, "Wheeled Coach Success—A Story of Trust," article dated Sep. 2010 (3 pages).
Canadian Patent Office. Office Action for Application No. 3,146,639, dated Mar. 4, 2024 (5 pages).

* cited by examiner

VEHICLE DOOR INCLUDING PUSH BUTTON ACTUATOR

CROSS-REFERENCE TO RELATED APPLICATIONS

This application claims priority to U.S. Provisional Patent Application No. 63/141,517, filed on Jan. 26, 2021, the entire contents of which are incorporated herein by reference.

BACKGROUND

The present invention relates to a door release for a vehicle.

SUMMARY

In one aspect, a door of a vehicle is disclosed. The vehicle includes a vehicle body. The door includes a door body coupled to the vehicle body. The door body is movable relative to the vehicle body between an open position and a closed position. The door further includes a latch movable relative to the door body between a latched position and an unlatched position. The latch is configured to secure the door body in the closed position when the latch in the latched position. An actuator is supported by the door body and operable to move the latch from the latched position to the unlatched position, and a push button is actuator supported by the door body and operable to move the latch from the unlatched position to the latched position. The actuator is operable to move the latch from the latched position to the unlatched position without operating the push button actuator, and the push button actuator is operable to move the latch from the latched position to the unlatched position without operating the actuator In another aspect, a door of a vehicle is disclosed. The vehicle includes a vehicle body. The door includes a door body coupled to the vehicle body. The door body is movable relative to the vehicle body between an open position and a closed position. The door also includes a latch movable relative to the door body between a latched position and an unlatched position. The latch is configured to secure the door body in the closed position when the latch is in the latched position. A first actuator is supported by the door body and operable to move the latch from the latched position to the unlatched position. A second actuator is supported by the door body and operable to move the latch from the unlatched position to the latched position. The first actuator is operable to move the latch from the latched position to the unlatched position without operating the second actuator, and the second actuator is linearly movable to move the latch from the latched position to the unlatched position without operating the first actuator.

In another aspect, an actuator assembly for use with a door of a vehicle is disclosed. The vehicle includes a vehicle body, and the door includes a door body coupled to the vehicle body. The door body is movable relative to the vehicle body between an open position and a closed position. A latch is movable relative to the door body between a latched position and an unlatched position. The latch is configured to secure the door body in the closed position when the latch is in the latched position. The actuator assembly includes an actuator supported by the door body and movable along a first axis, a cam selectively engageable by the actuator and rotatable about a second axis that is different than the first axis, and a linkage operably coupled between the cam and the latch and oriented along a third axis that is different from the first axis and second axis. The actuator is operable to rotate the cam thereby causing a force coincident with the third axis to be exerted on the linkage to move the latch from the latched position to the unlatched position.

Other aspects will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The term "approximately" as defined in this application means plus or minus three inches. The invention is capable of other embodiments and of being practiced or of being carried out in various ways.

Figure 1:
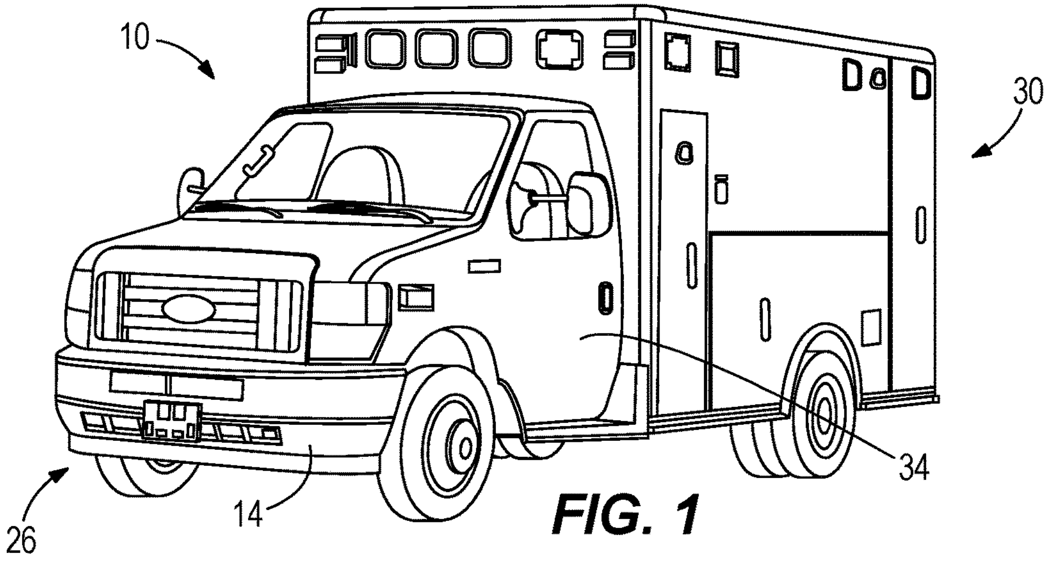
FIG. 1 is a perspective view of a vehicle according to one embodiment.
Figure 2:
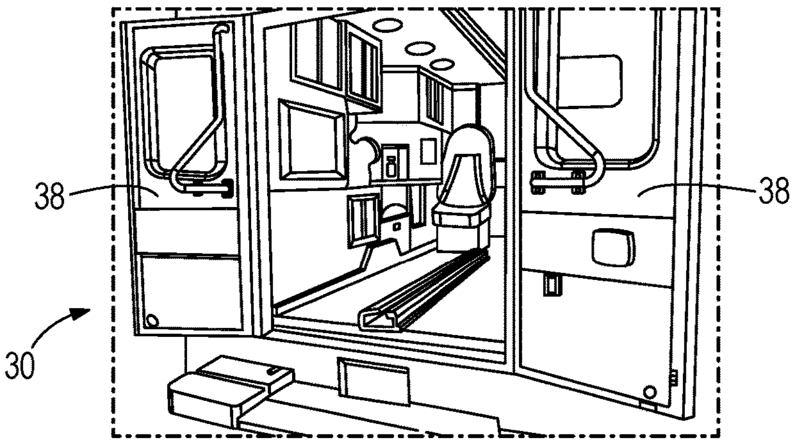
FIG. 2 is a rear perspective view of the vehicle of FIG. 1 illustrating an entry door and a second door.
Figure 3:
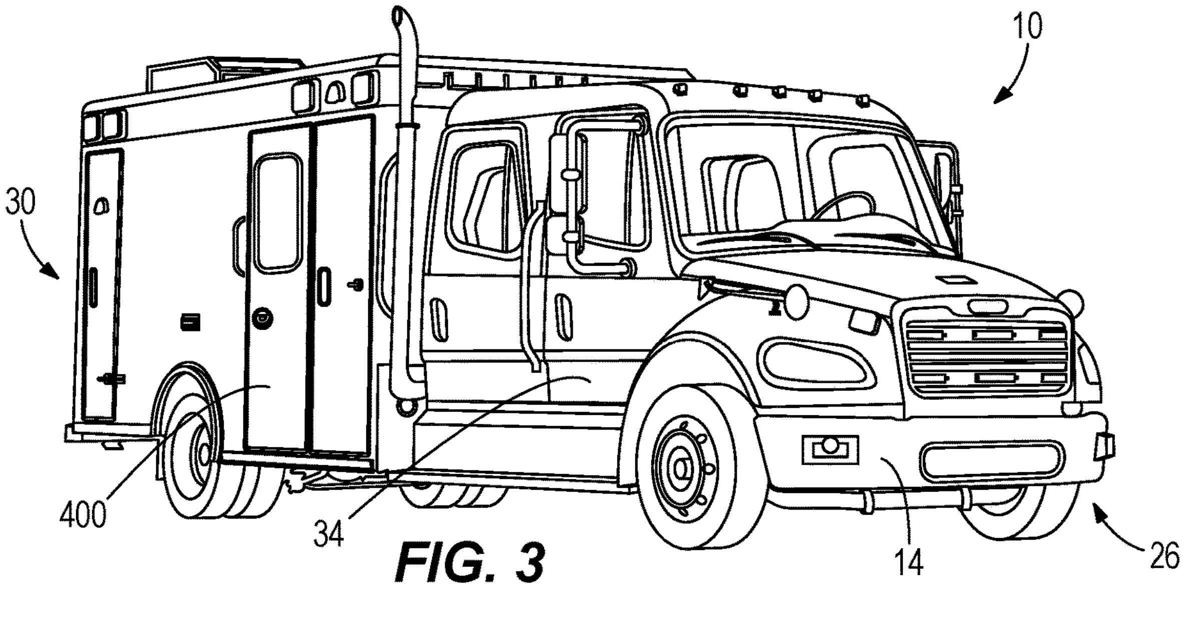
FIG. 3 is a perspective view of a vehicle according to another embodiment.

FIGS. 1-3 illustrate a vehicle 10 including a vehicle body 14. In the illustrated embodiment, the vehicle 10 is an emergency vehicle or an ambulance and includes a cab 26 and a passenger patient compartment 30. A first door 34 is positioned on one side of the cab 26 and a second door 34 is positioned on another side of the cab 26. The doors 34 are operable to allow access to an interior of the cab 26. The patient compartment 30 is sized to accommodate one or more patients and one or more emergency personnel. The patient compartment 30 of the vehicle 10 of FIGS. 1-3 includes a first door 38 and a second door 38. The first and second 38 are operable to allow access to an interior of the patient compartment 30. In the illustrated embodiment, the first and second doors 38 are rear entry doors, but in other embodiments, the patient compartment 30 may include doors in other locations (e.g., side entry doors, discussed below).

Figure 4:
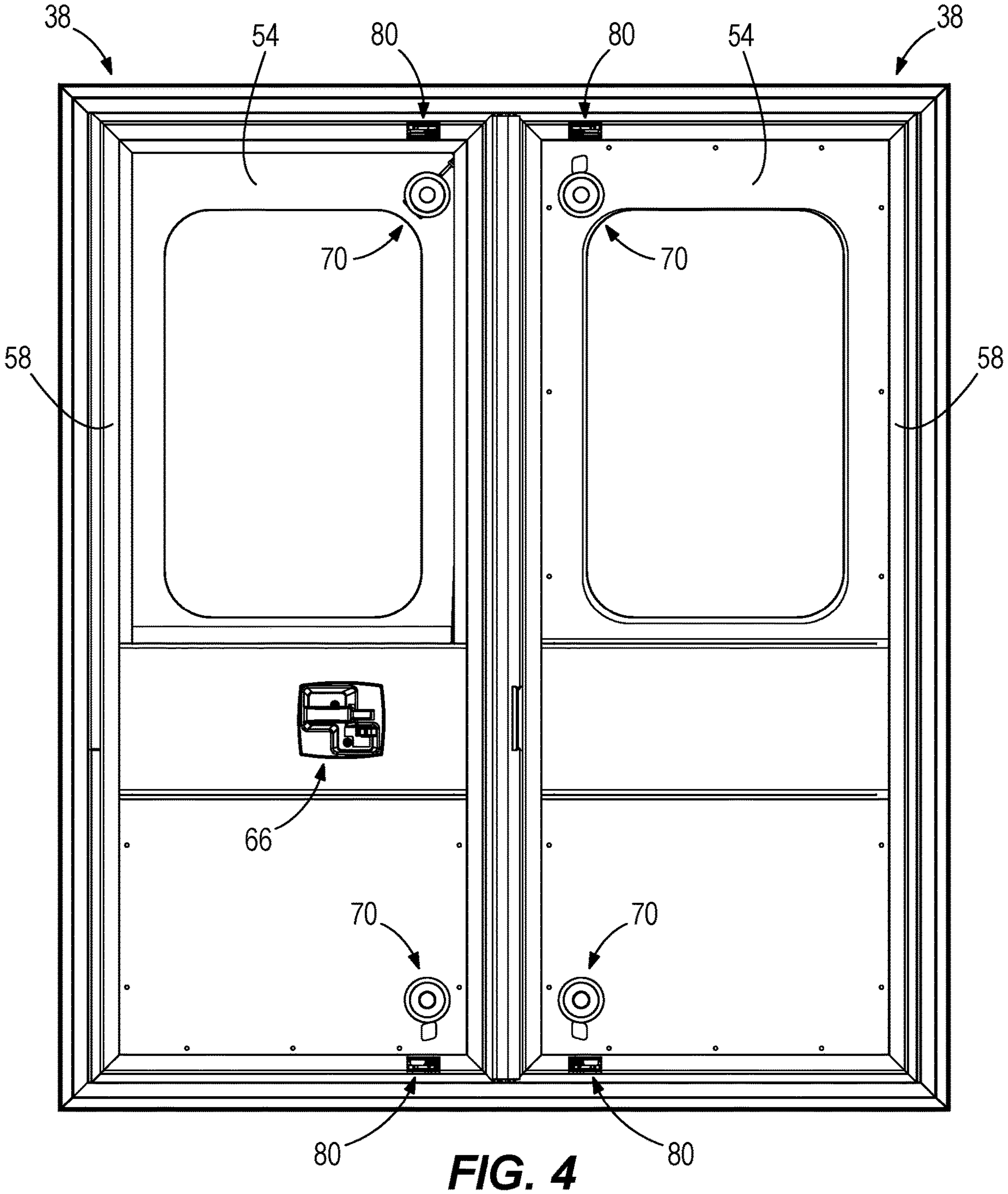
FIG. 4 shows first and second doors for use with either the vehicle of FIG. 1 or 3, each of the first and second doors including an actuator, a first latch, a second latch, a first push button actuator, and a second push button actuator.
Figure 5:
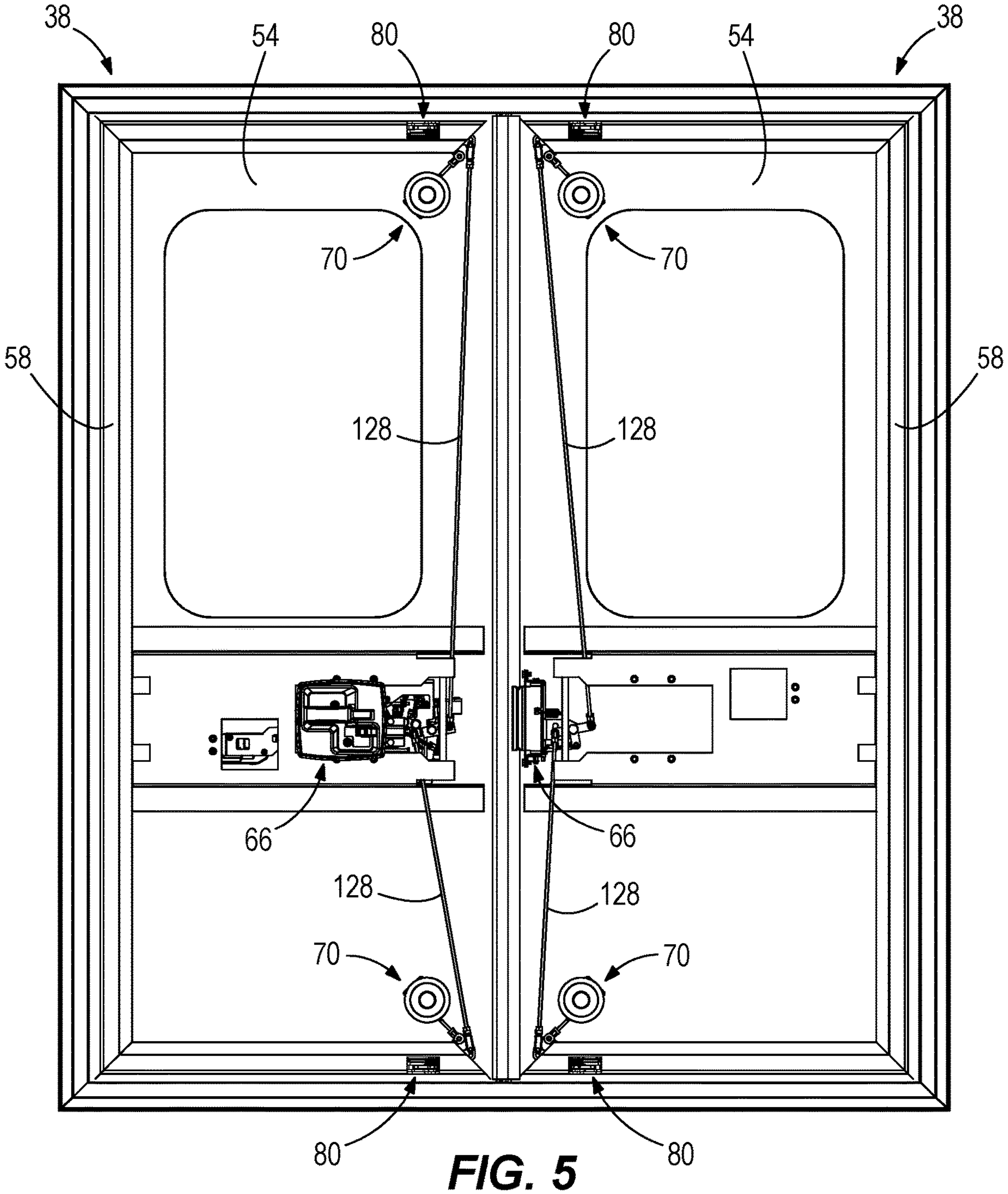
FIG. 5 is a view of the first and second doors of FIG. 4 with a portion removed.

Each of the first and second rear entry doors 38 are coupled to the vehicle body 14 and movable relative to the vehicle body 34 between an open position and a closed position. The first and second doors rear entry doors 38 are substantially similar and operate in a similar manner. Therefore, although only the first rear entry door 38 is discussed in detail, the second rear entry door 38 includes similar structure and operates in a similar manner. As shown in FIGS. 2, 4-5, the first rear entry door 38 includes a body 54 that is movably (e.g., pivotably, hingeably, slideably) coupled to the vehicle body 14. In the illustrated embodiment, a frame 58 encloses or surrounds the body 54. A latch 80 is supported by the body 54 adjacent the frame 58. In the illustrated embodiment, the first rear entry door 38 includes two latches 80—one positioned near a first or upper side of the first door 38 and one positioned near a second or lower side of the first rear door 38. The latch 80 is movable relative to the first rear entry door 38 between a latched position and an unlatched position. The latch 80 is configured to secure the first rear entry door 38 in the closed position when the latch 80 in the latched position. The first rear entry door 38 further includes an actuator 66, a first push button actuator 70, and a second push button actuator 70. The first push button actuator 70 corresponds to the upper latch 80 and the second push button actuator 70 corresponds to the lower latch 80. The actuator 66 is operable to simultaneously move the latches 80 from the unlatched position to the latched position to open the first rear entry door 38. The first and second push button actuators 70 are separately operable to move the adjacent latch 80 from the latched position to the unlatched position. The first and second push button actuators 70 are configured to actuate the adjacent latches 80 should the actuator 66 become inoperable.

Figure 6:
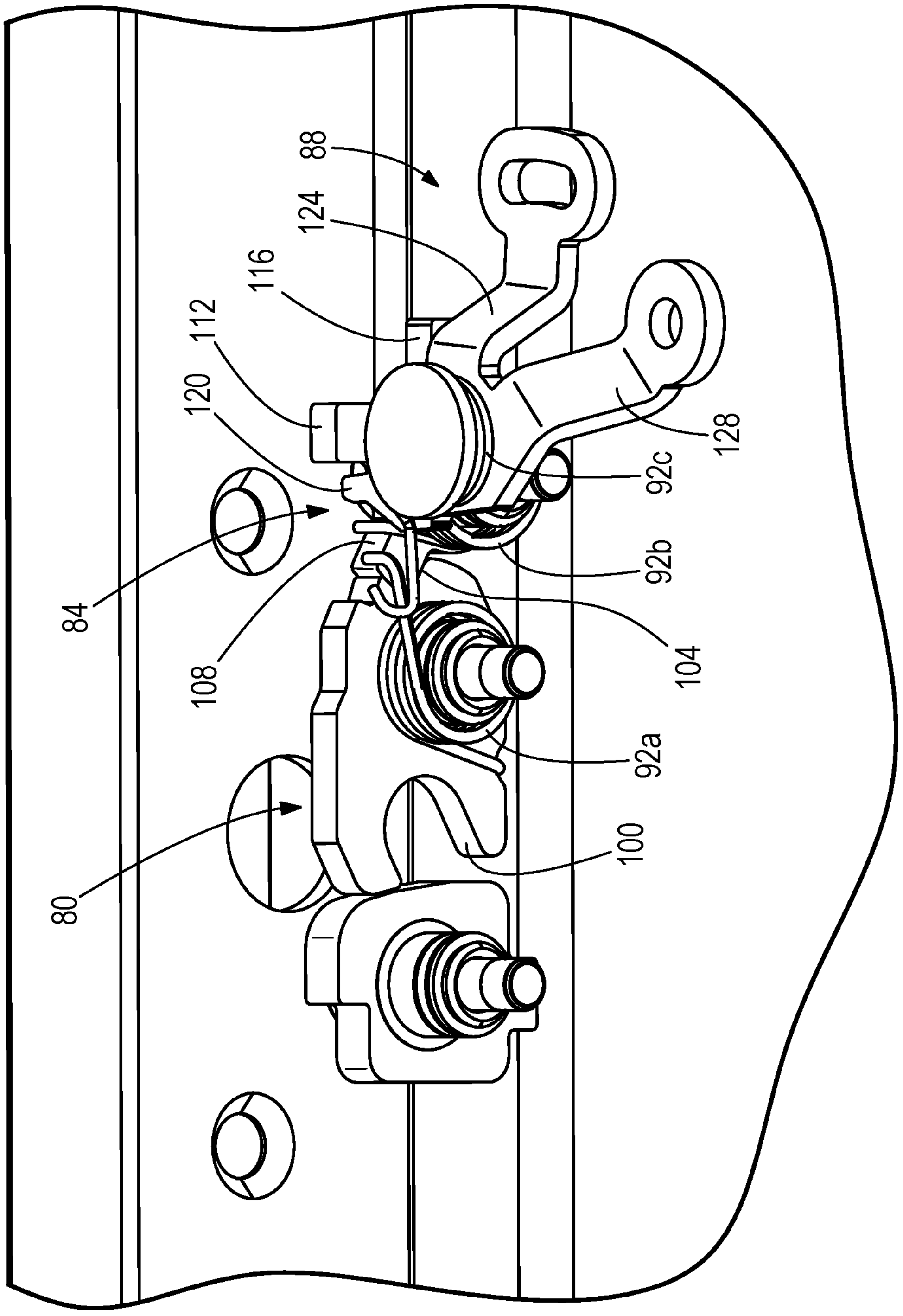
FIG. 6 is a perspective view of the first latch of FIG. 4.
Figure 7:
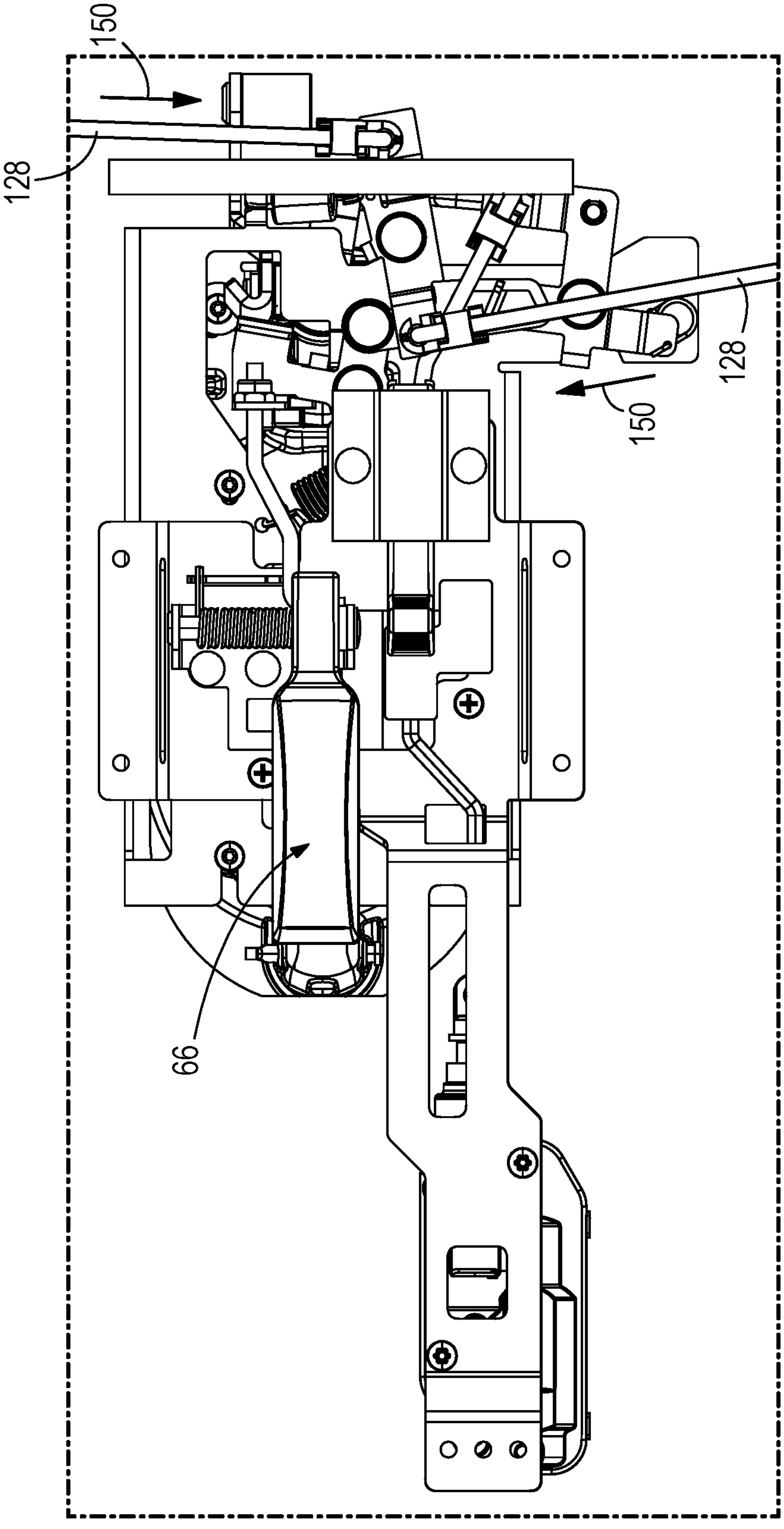
FIG. 7 is a view of the actuator.
Figure 8:
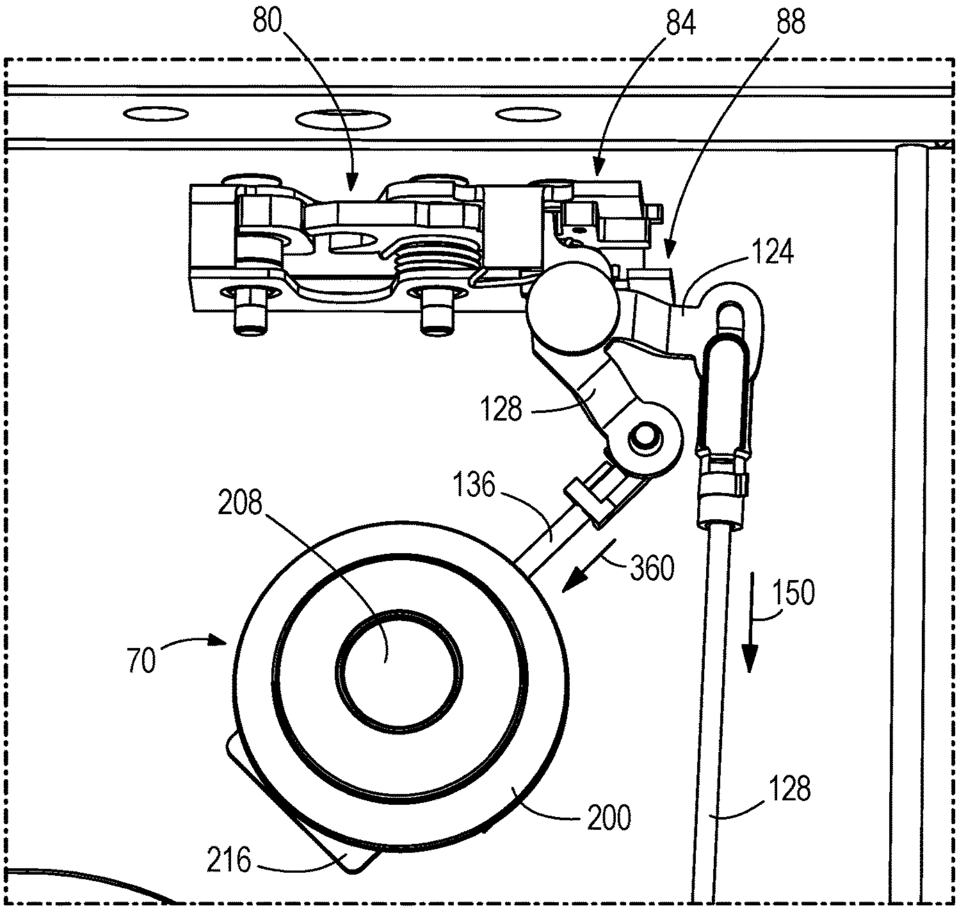
FIG. 8 is a perspective view of the first push button actuator of FIG. 4.

With respect to FIG. 6, each of the upper and lower latches 80 is part of a latch assembly. Although only one latch assembly is described in detail, both the upper and lower latch assemblies of the first rear entry door 38 have the same elements and operate in a similar manner. In addition to the latch 80, the latch assembly includes an intermediate latch 84 that selectively engages the latch 80, a cam 88 that selectively engages the intermediate latch 84, a first spring **92*a*, a second spring 92*b*, and a third spring 92*c***.

The latch 80 includes a first recess 100 and a second recess 104. The first recess 100 selectively receives and secures a component (e.g., rod, recess, projection, etc., not shown) positioned on the vehicle body 14 of the vehicle 10 and a second recess 104. The first spring **92*a* biases the latch in the unlatched position. The intermediate latch 84 includes a first projection 108, a second projection 112, and a third projection 116. The second spring 92*b* biases the first projection 108 of the intermediate latch 84 into engagement with the second recess 104 the latch 80. The cam 88 includes a projection 120, a first leg 124, and a second leg 132. The first leg 124 is operably coupled to the actuator 66 by a first linkage 128. The second leg 132 is operably coupled to the respective push button actuator 70 by a second linkage 136. The third spring 92*c* biases the projection 120 of the cam 88 out of engagement with the second projection 112 of the intermediate latch 84. When the latch 80 is in the latched position, the projection 120 engages the second projection 112 of the intermediate latch 84 and the first projection 108 engages the second recess 104 of the latch 80 such that the latch 80 is prevented from moving to from the latched to the unlatched position via the bias of the first spring 92*a***.

Figure 9:
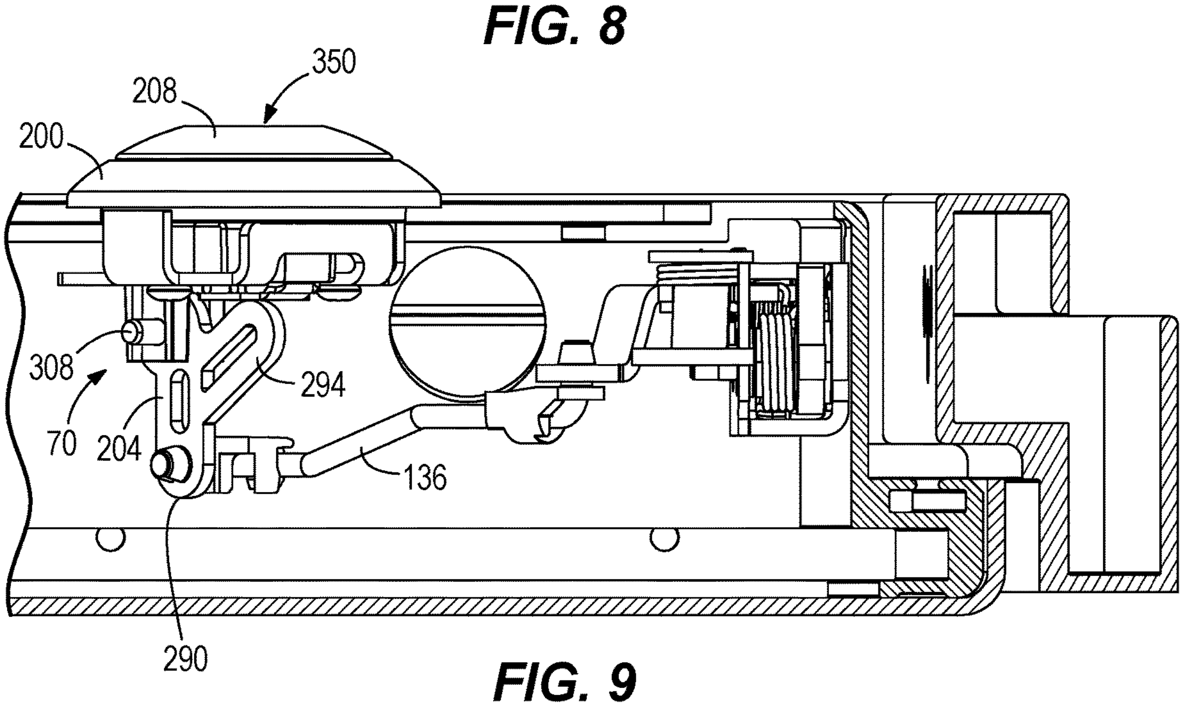
FIG. 9 is another perspective view of the first push button actuator of FIG. 4.
Figure 10:
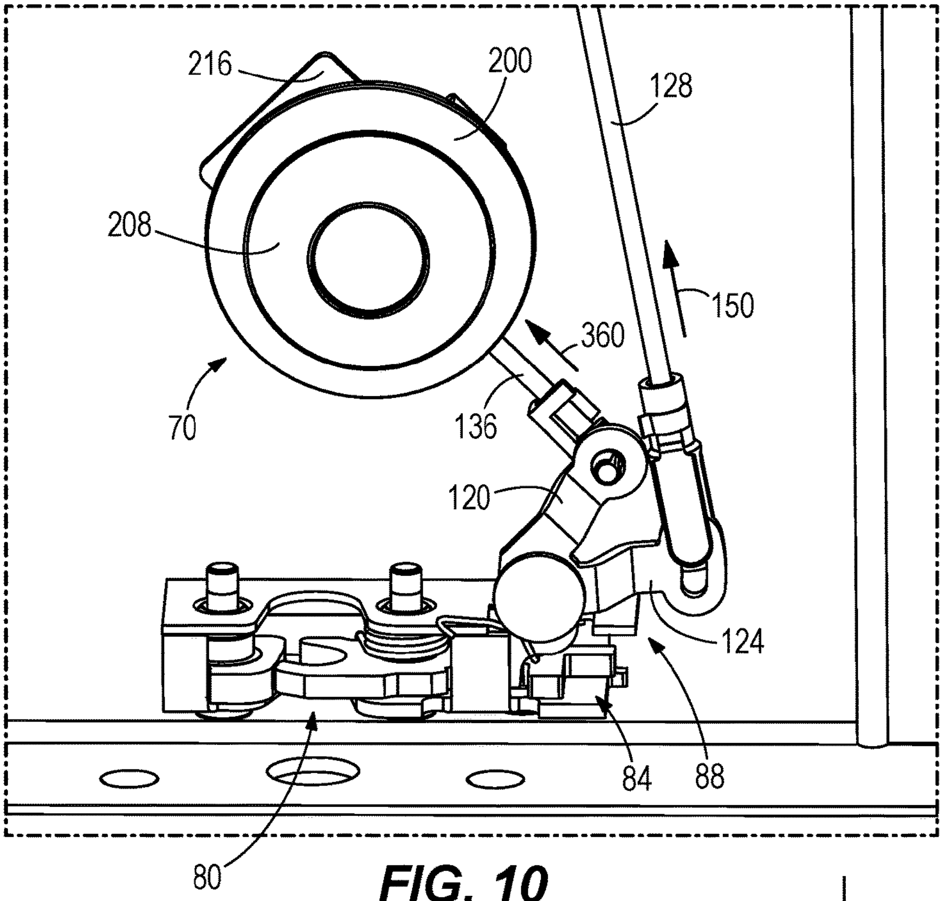
FIG. 10 is a perspective view of the second push button actuator of FIG. 4.
Figure 11:
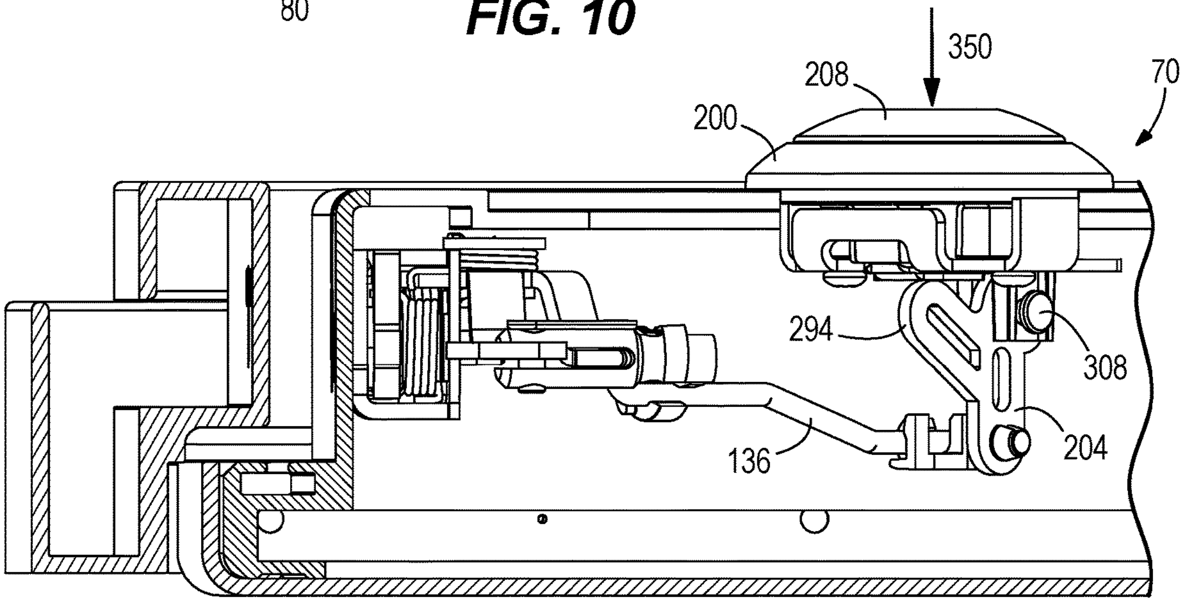
FIG. 11 is another perspective view of the second push button actuator of FIG. 4.
Figure 13:
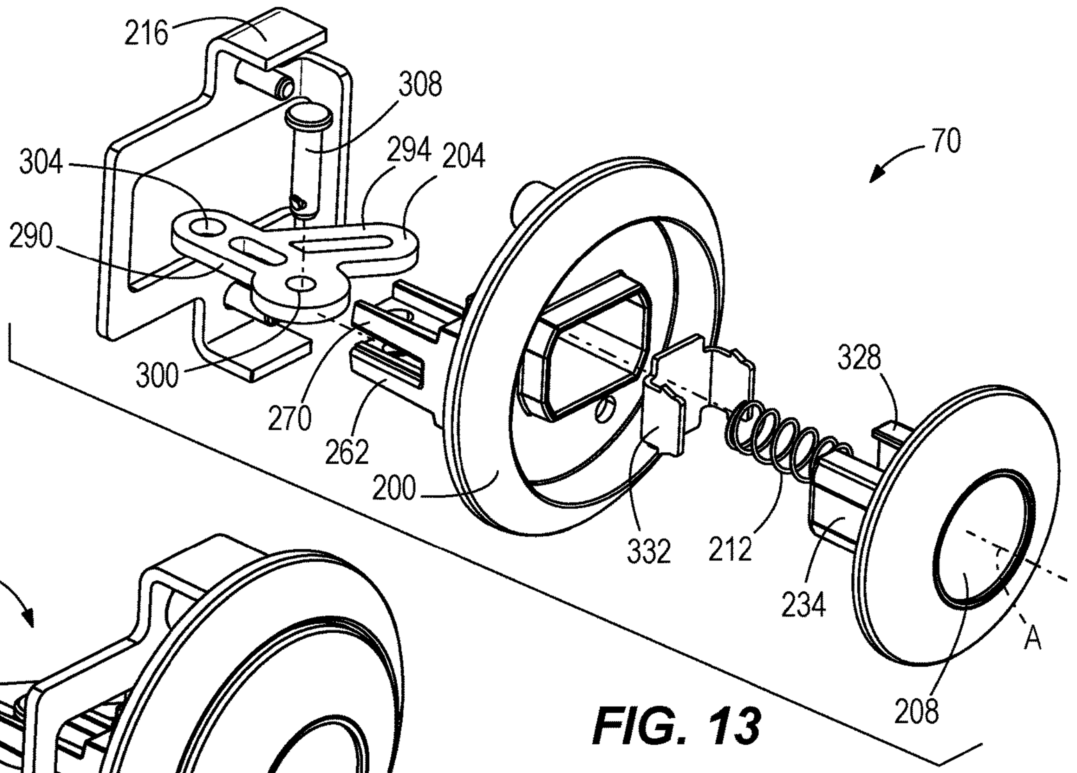
FIG. 13 is an exploded view of the first and second push button actuators of FIG. 4.
Figure 12:
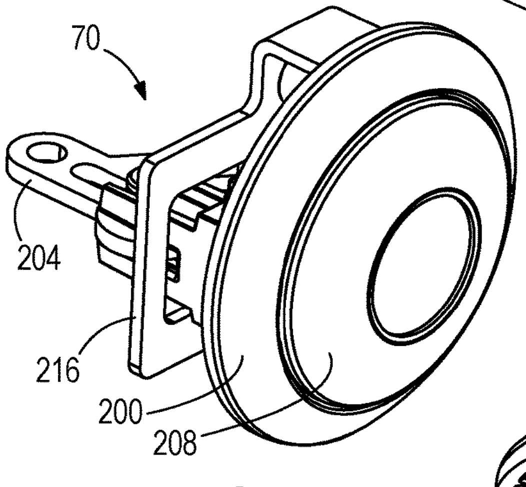
FIG. 12 is a perspective view of the first and second push button actuators of FIG. 4.
Figure 14:
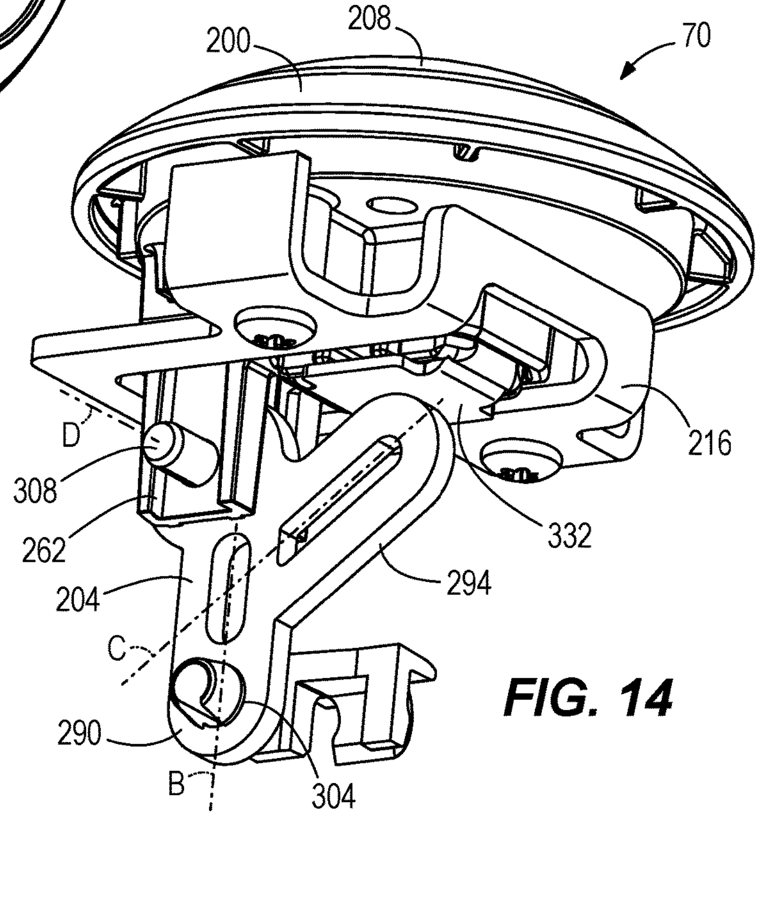
FIG. 14 is another perspective view of the first and second push button actuators of FIG. 4.
Figure 15:
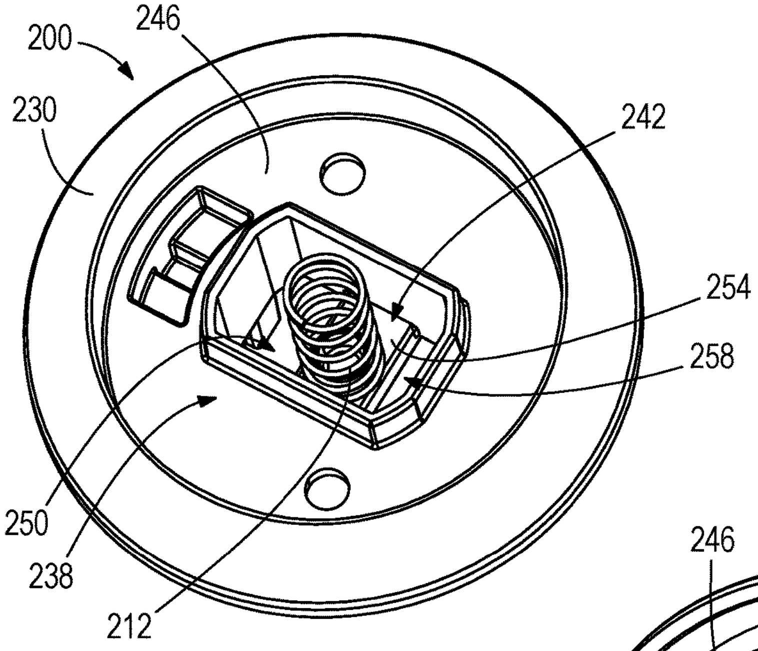
FIG. 15 is a perspective view of a portion of the first and second push button actuators of FIG. 4.
Figure 16:
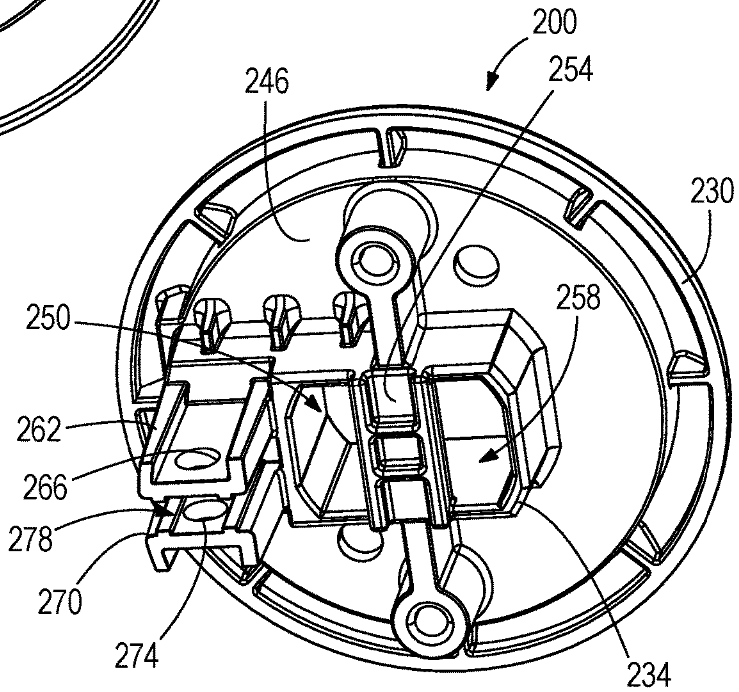
FIG. 16 is another perspective view of the portion of the first and second push button actuators of FIG. 15.
Figure 17:
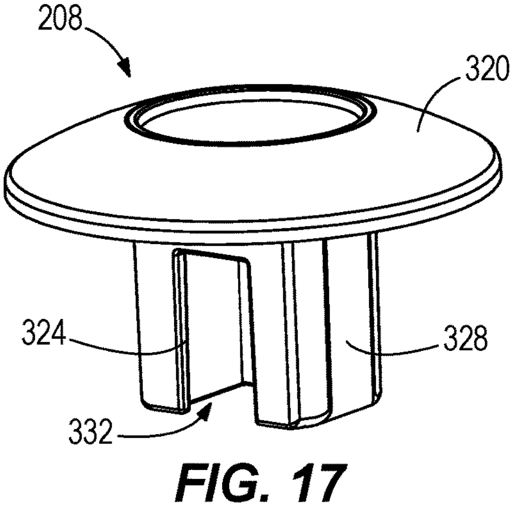
FIG. 17 is a perspective view of another portion of the first and second push button actuators of FIG. 4.
Figure 18:
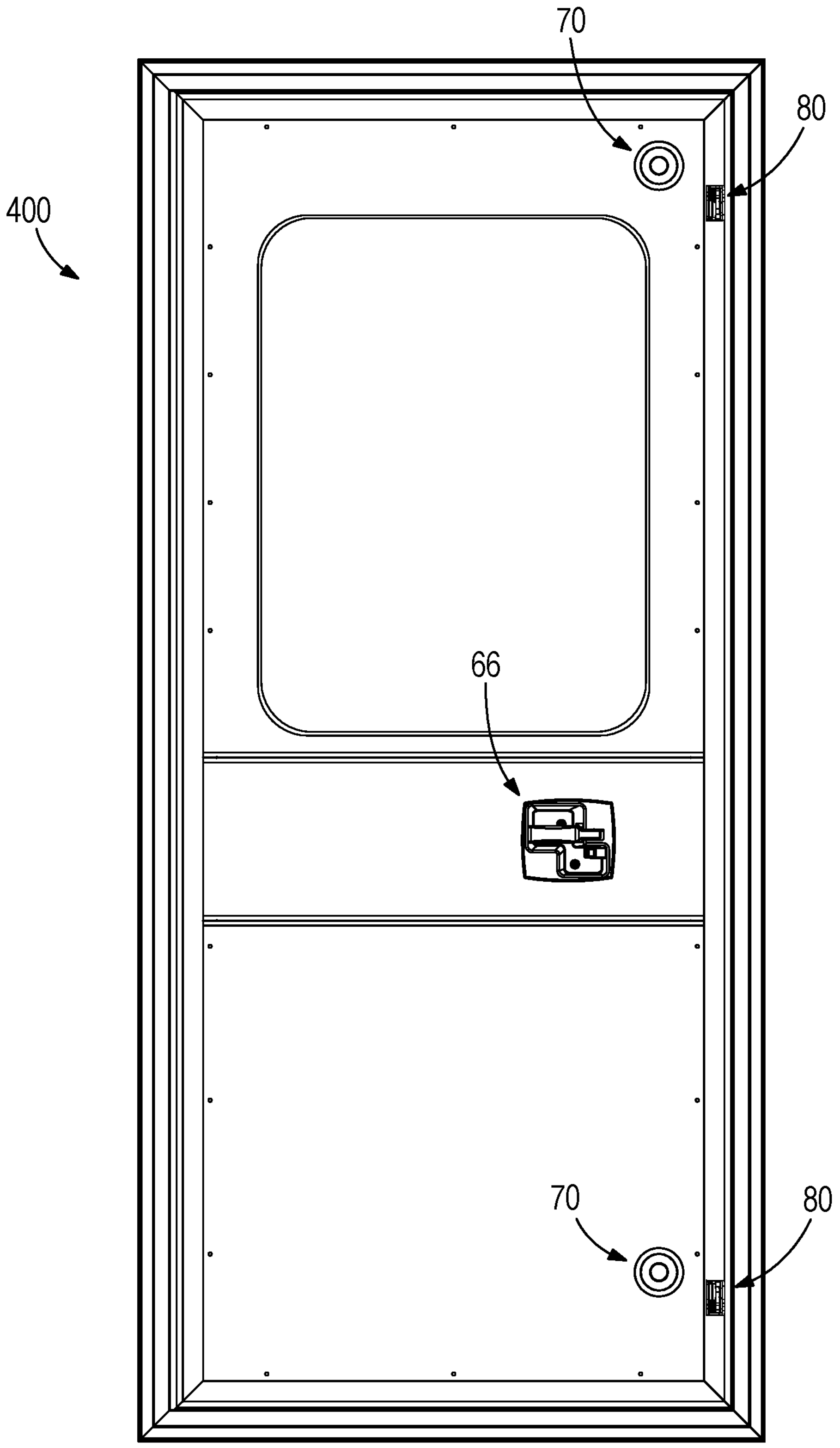
FIG. 18 is a view of another door suitable for use with the vehicle of FIG. 3, the door including an actuator, a first latch, a second latch, a first push button actuator, and a second push button actuator.
Figure 19:
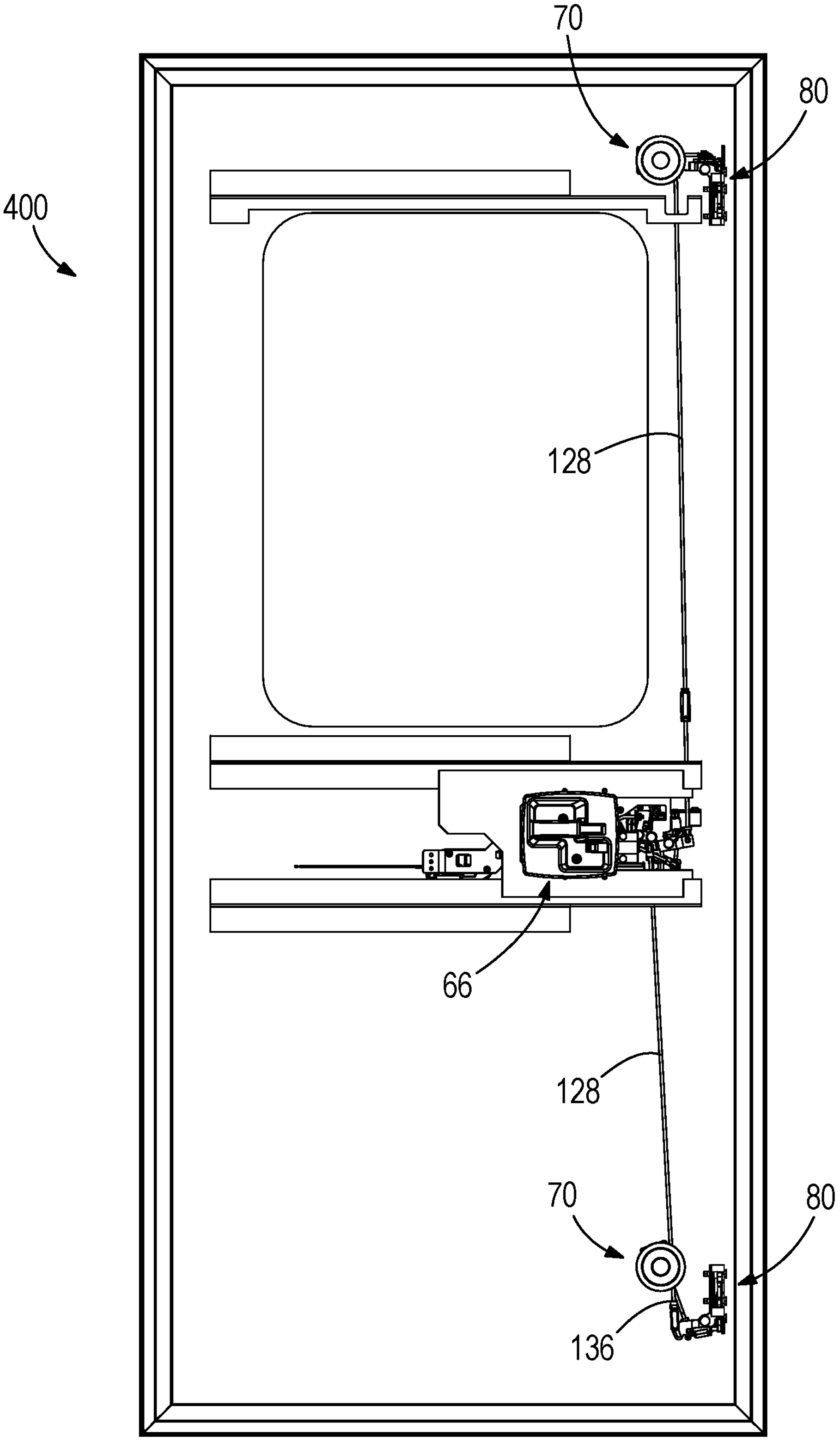
FIG. 19 is a view of the door of FIG. 18 with a portion removed.

With respect to FIGS. 6-8 and 10, the actuator 66 is movable (e.g., rotatable, pivotable, slideable, depressible, etc.) to simultaneously move the latch 80 between the latched position and latched position. Actuation (e.g., rotatable movement, pivotable movement, slideable movement, depressible movement, etc.) of the actuator 66 causes the first linkage 128 to exert a force on the cam 88 in the direction of arrow 150 (e.g., away from the respective latch assembly). In the illustrated embodiments, the actuator is a rotatable actuator and is therefore rotatable to simultaneously move the latch 80 between the latched position and latched position. In other embodiments, the actuator 66 may be another type of actuator, such as a slideable actuator for example. The force on the cam 88 in the direction of arrow 150 causes the cam 88 to move (e.g., rotate, pivot) against the bias of the third spring **92*c* in a first direction. That is, in the illustrated embodiment, the force on the cam 88 of the upper latch assembly causes the cam 88 to rotate clockwise in the views shown in FIGS. 8-9. Similarly, the force on the cam 88 of the lower latch assembly causes the cam 88 to rotate counterclockwise in the views shown in FIG. 10-11. The projections 120 of the respective cam 88 engage the second projection 112 of the intermediate latch 84. As the projection 120 of the cam 88 engages the second projection 112 of the intermediate latch 84, the intermediate latch 84 moves (e.g., rotates, pivots) against the bias of the second spring 92*b* in the first direction such that the first projection 108 thereof disengages the second recess 104 of the latch 80. As the first projection 108 of the intermediate latch 84 disengages the second recess 104 of the latch 80, the latch 80 moves (e.g., rotates, pivots) with the bias of the first spring 92*a*** in the first direction from the latched to the unlatched position.

Release of the actuator 66 causes the first linkages 128 to exert a force on the respective cam 88 in the direction opposite of arrow 150. This causes the cam 88 to move (e.g., rotate, pivot) with the bias of the third spring **92*c* in a second direction opposite the first direction. That is, in the illustrated embodiments, the cam 88 of the upper latch assembly rotates counterclockwise in the views shown in FIGS. 8-9. Similarly, the cam 88 of the lower latch assembly rotates clockwise in the views shown in FIG. 10-11. Therefore, the projection 120 of the respective cam 88 disengages the second projection 112 of the intermediate latch 84. As the projection 120 of the cam 88 disengages the second projection 112 of the intermediate latch 84, the intermediate latch 84** moves (e.g., rotates, pivots) with the bias of the second spring 92*b* in the second direction such that the first projection 108 thereof engages the second recess 104 of the latch 80. As the first projection 108 of the intermediate latch 84 engages the second recess 104 of the latch 80, the intermediate latch 84 moves (e.g., rotates, pivots) the latch 80 against the bias of the first spring 92*a* in the second direction from the latched to the unlatched position.

The push button actuator 70 is shown in greater detail in FIGS. 8-17. As noted above, the push button actuator 70 is configured to actuate the latch 80 should the actuator 66 become inoperable. That is, should the actuator 66 or either of the first linkages 128 become inoperable due to damage in a collision, for example, the push button actuator 70 may actuate the respective latch 80 to open the respective door 38. The push button actuators 70 are operable separately (e.g., independently) from one another to actuate the respective latch 80 to open the door 38. Like the actuator 66, the push button actuator 70 is operable to move the corresponding latch 80 between the unlatched position and the latched position. Although only one push button actuator 70 is described in detail herein, both push button actuators 70 of each of the doors 38 have the same elements and operate in a similar manner.

As shown in FIGS. 12-17, the push button actuator 70 includes a housing 200, a cam 204 movably supported by the housing 200, a push button 208 (e.g., a linear actuator) movably supported by the housing 200, and a spring 212 positioned between housing 200 and the push button 208. In the illustrated embodiment, retainer clip 216 supports the housing 200 relative to the door 28. In some embodiments, the retainer clip 216 may be omitted.

The housing 200 includes a body that has a first portion 230, a second portion 234, and an axis A. The first portion 230 includes a recess 238 and an opening 242 extending through a wall 246 of the recess 238. The second portion 234 extends from the first portion 230 and is aligned with the opening 238 in the recess 238. A first aperture 250 extends through a wall 254 of the second portion 234 and a second aperture 258 extends through the wall 254 of the second portion 234. The spring 212 is at least partially positioned within the second portion 234 and supported by the wall 254 of the second portion 234. The first aperture 250, the second aperture 258, and the spring 212 are oriented in parallel with the axis A. A first leg 262 having a first aperture 266 extends from the first portion 230, and a second leg 270 having a second aperture 270 extends from the first portion 230. The first and second legs 266, 270 are offset relative to the second portion 234. The first and second legs 262, 270 are parallel with one another and spaced apart from one another by a gap 278. The first and second legs 262, 270 are oriented parallel to the axis A. The first and second apertures 266, 274 of the respective first and second legs 262, 270 are aligned with (e.g., coincident with) one another.

The cam 204 is positioned within the gap 276 between the first leg 262 and the second leg 270 of the housing 200. The cam 204 includes a first portion 290 and a second portion 294 that is integrally formed with (or otherwise coupled to) the first portion 290. The first portion 290 defines an axis B and the second portion 294 defines an axis C that is positioned at an angle relative to the axis B. In the illustrated embodiment, the axis C is positioned at a non-parallel and non-perpendicular angle relative to the axis B. A first aperture 300 and a second aperture 304 extend through of the first portion 290. The first and second apertures 300, 304 are positioned at opposite ends of the first portion 290. The first aperture 300 is aligned with (e.g., coincident with) the first and second apertures 300, 304 of the respective first and second legs 262, 270. The first aperture 300 receives a pin 308 that movably (e.g., pivotably or rotationally) couples the cam 204 to the first and second legs 262, 270 of the housing 200. The pin 308 defines an axis D that is perpendicular to the axis A in the illustrated embodiment. The second aperture 304 secures the second linkage 136 to the first portion 290 of the cam 204.

The push button 208 is at least partially positioned within the housing 200. The push button 208 includes a body that has an actuatable portion 320 and a first leg 324 and a second leg 328 that extend from the actuatable portion 320. The first leg 324 and the second leg 328 are parallel with one another and spaced apart from one another by a gap 332. The actuatable portion 320 is positioned in the recess 238 of the first portion 230 of the housing 200, and the first and second legs 324, 328 are at least partially positioned in the second portion 234. The actuatable portion 230 defines an actuatable surface that is accessible to a user. The first and second legs 324, 328 extend through the respective first and second apertures 250, 258 of the second portion 234 of housing 200 parallel to the axis A, while the wall 254 of the second portion 234 and the spring 212 are positioned within gap 332 between the first leg 324 and the second leg 328 of the push button 208. A coupler or clip 336 couples the distal ends of first and second legs 324, 328 of the push button 208 and prevents removal of the push button 208 from the housing 200. The clip 236 is selectively configured to engage the second portion 294 of the cam 204, as will be discussed in greater detail below.

The push button 208 is movable relative to the housing 200 between a first, unactuated position and a second, actuated position. The spring 212 biases the push button 208 into the unactuated position.

Operation of each of the push button actuators 70 is as follows. Actuation of the push button 208 moves the latch 80 of the respective latch assembly from the latched position to the unlatched position. As shown in FIGS. 8-11, a force exerted on the actuating surface of the push button 208 in the direction of arrow 350, moves (e.g., linearly moves, depresses) the push button 208 in the direction of the arrow 350 from the unactuated position to the actuated position such that the push button 208 moves further into the recess 238 of the housing 200. As the push button 208 moves further into the recess of the housing 200, the distal ends of the legs 324, 328 of the push button 208 move through the respective first and second apertures 250, 258 toward the cam 204 such that the clip 332 engages the second portion 294 of the cam 204. As the clip 332 engages the second portion 294 of the cam 204, the cam 204 rotates about the axis D of the pin 308 and the second linkage 136 moves linearly in the direction of arrow 360 (e.g., away from the respective latch assembly). As the second linkage 136 moves in the direction of arrow 360, the second linkage 360 to exerts a force on the cam 88 in the direction of arrow 360, which causes latch 80 to move from the latched to the unlatched position via the sequential movement of the cam 88, intermediate latch 84, and latch 80, as discussed above with respect to the operation of the actuator 66.

Release of the push button 208 moves the latch 80 of the respective latch assembly from the unlatched position to latched position. Release of the push button 208 (e.g., removable of the force on the push button 208) causes the spring 212 to move the push button 208 from the actuated position to the unactuated position. The cam 204 then rotates about the axis D of the pin 308 such that the second linkage 136 exerts a force on the cam 204 in the direction opposite of arrow 360 (e.g., toward the respective latch assembly)

causes latch 80 to move from the unlatched to the latched position via the sequential movement of the cam 88, intermediate latch 84, and latch 80, as discussed above with respect to the operation of the actuator 66.

The patient compartment 30 of the vehicle 10 may have other door configurations. For example, the patient compartment 30 of the vehicle of FIG. 3 includes the first and second rear entry doors 38 (not shown in FIG. 3) and a side entry door 400. The side entry door 400 is shown in greater detail with respect to FIGS. 18-24. The rear entry doors 38 may operate as discussed above with respect to FIGS. 4-17. As shown, the side entry door 400 has similar features to the rear entry doors 38 so like reference numerals will be used for like structure and only the differences discussed herein.

Figure 20:
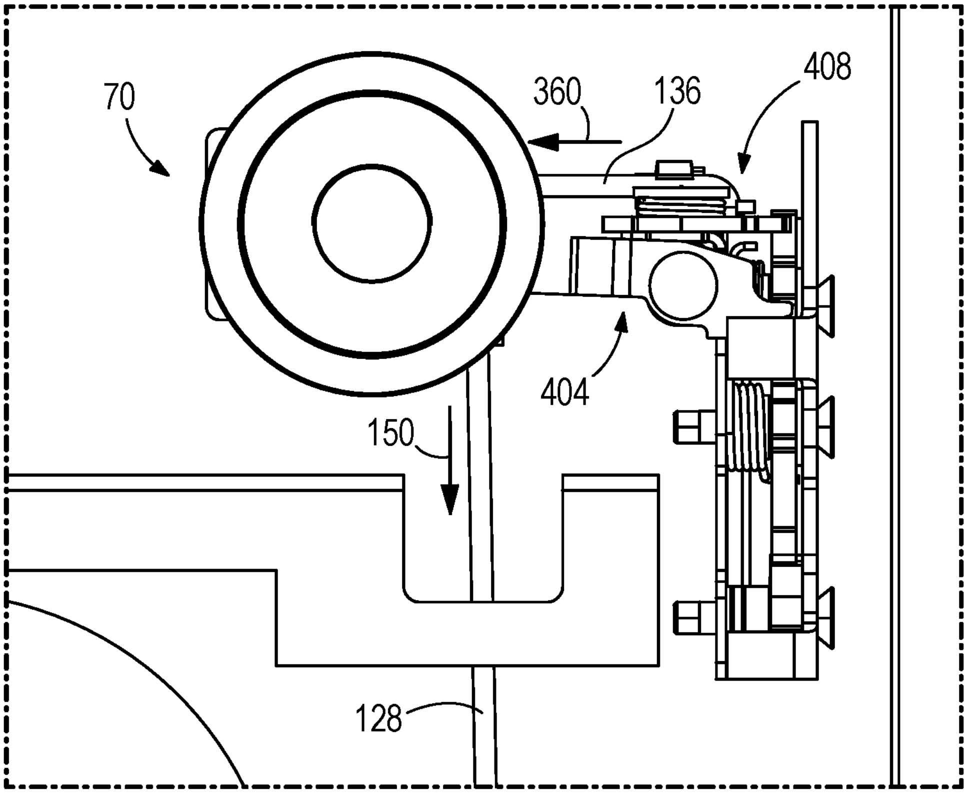
FIG. 20 is a perspective view of the first push button actuator of FIG. 18.
Figure 21:
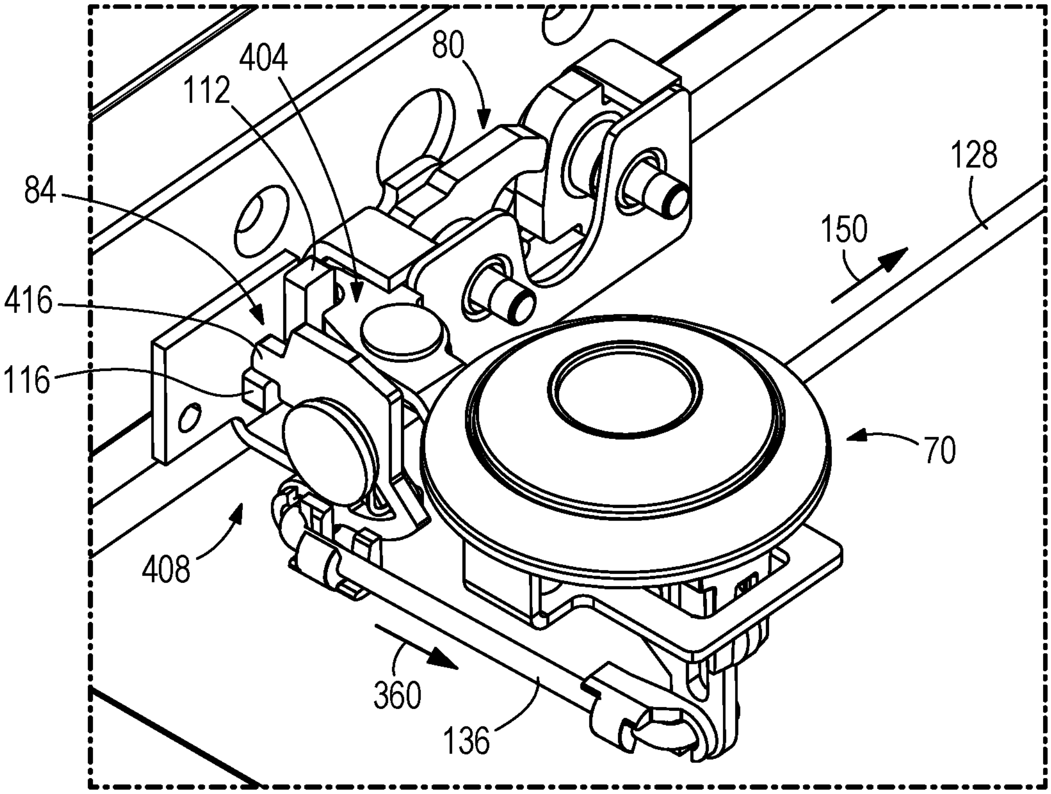
FIG. 21 is another perspective view of the first push button actuator of FIG. 18.
Figure 22:
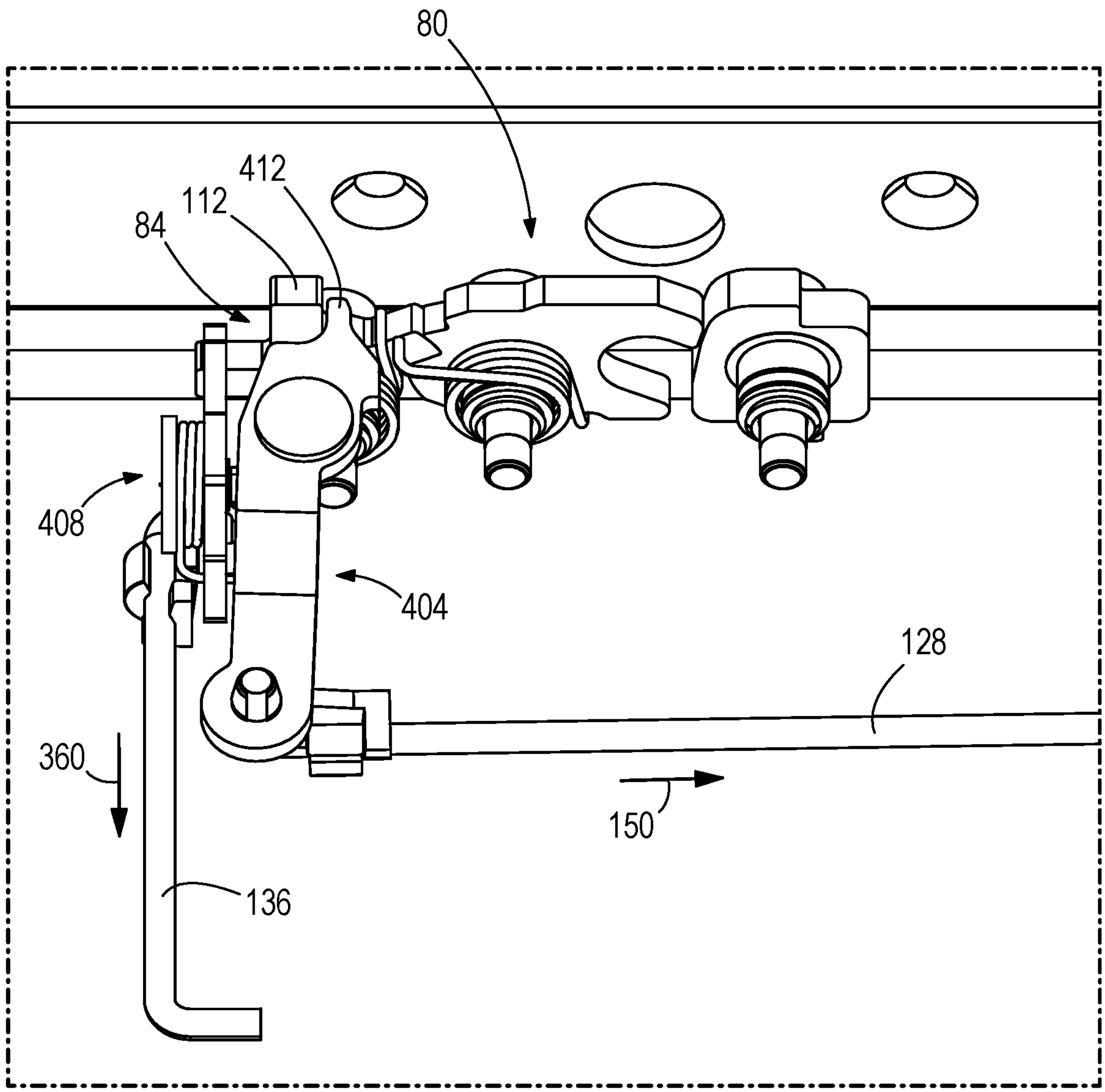
FIG. 22 is another perspective view of the second push button actuator of FIG. 18.
Figure 23:
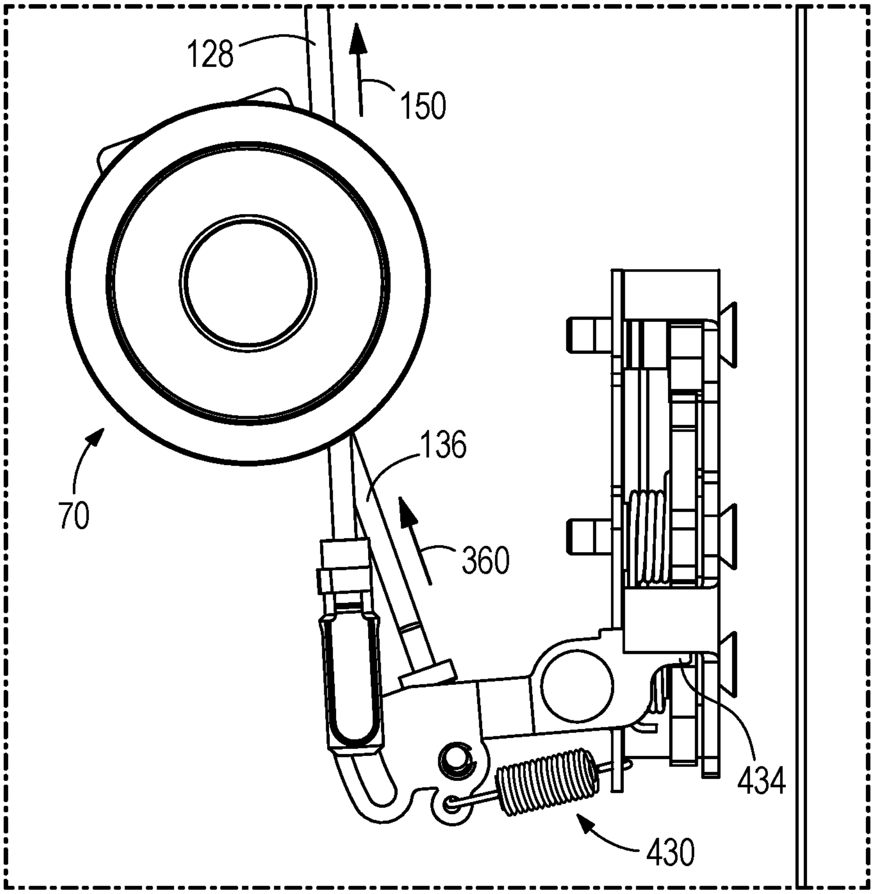
FIG. 23 is a perspective view of another of the second push button actuator of FIG. 18.
Figure 24:
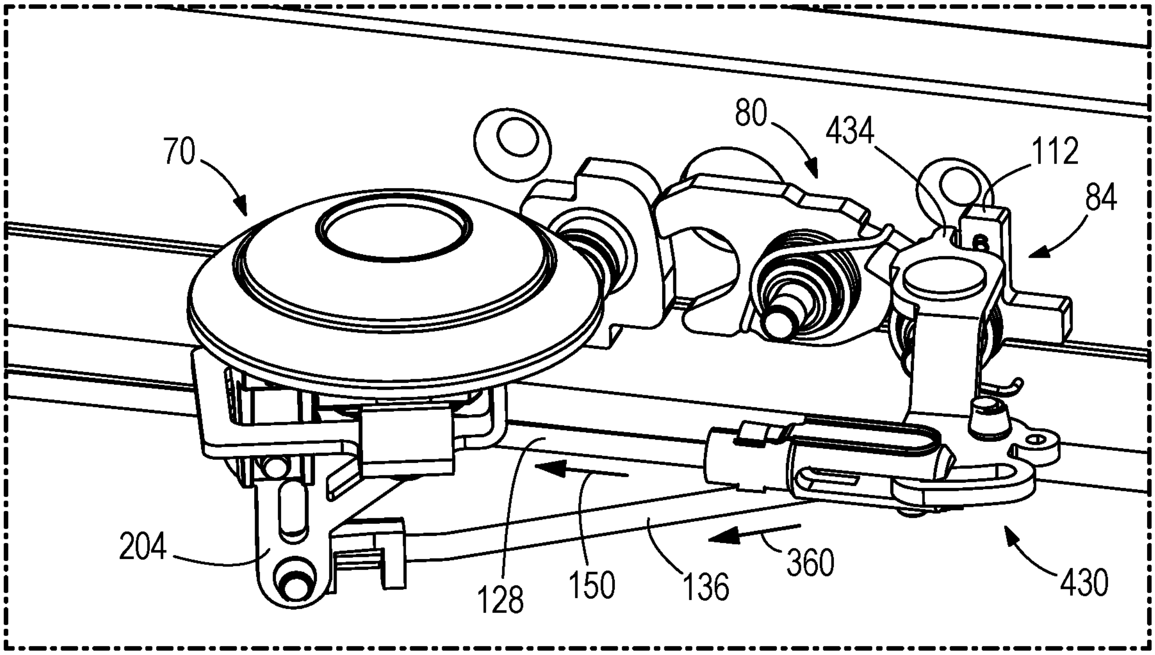
FIG. 24 is another perspective view of another of the first push button actuator of FIG. 18.

As shown in FIGS. 20-24, latch assemblies of the side entry door 400 include different cams than the latch assemblies of FIGS. 4-17. As shown in FIGS. 20-22, one of the latch assemblies (e.g., the upper latch assembly in the illustrated embodiment), includes a first cam 404 and a second cam 408 instead of the single cam 88. The first cam 404 includes a body. The body has one end with a projection 412 that is configured to engage the second projection 112 of the intermediate latch 84. The body has an opposite end that is coupled to the first linkage 128. The second cam 208 includes a projection 416 that is configured to engage the third projection 116 of the intermediate latch 84. The second linkage 136 is coupled to the second cam 416. As shown in FIGS. 23-24, one of the latch assemblies (e.g., the lower latch assembly in the illustrated embodiment), includes a single cam 430. The cam 430 includes a body. The body has one end with a projection 434 that is configured to engage the second projection 112 of the intermediate latch 84. The body has an opposite end that is coupled to both the first linkage 128 and the second linkage 136.

Actuation (e.g., rotatable or pivotable movement) of the actuator 66 causes the first linkages 128 to simultaneously exert a force on the cam 404, 430 of the respective upper and lower latch assemblies in the direction of arrow 150. The force in the direction of arrow 150 on the cam 404, 430 causes the respective latch 80 to move from the latched to the unlatched position via the sequential movement of the cam 404, 434, intermediate latch 84, and latch 80, as discussed above with respect to the operation of the embodiment of FIGS. 4-17. Release of the actuator causes the first linkages 128 to exert a force on the cam 404, 434 of the respective upper and lower latch assemblies in the direction opposite of arrow 150. The force in direction opposite the arrow 150 on the cam 404, 430, causes latch 80 to move from the unlatched to the latched position via the sequential movement of the cams 404, 434, intermediate latch 84, and latch 80, as discussed above operation of the embodiment of FIGS. 4-17.

Actuation of the push button 208 moves the latch 80 of the respective latch assemblies from the latched position to the unlatched position in a similar manner as discussed above with respect to FIGS. 4-17. With respect to the upper latch assembly, as the second linkage 136 moves in the direction of arrow 360 (e.g., away from the upper latch assembly), the second linkage 236 to exerts a force on the second cam 408 in the direction of arrow 360. The projection 416 of the second cam 408 thus engages the third projection 416 of the intermediate latch 84 to move the intermediate latch 84 in the first direction (e.g., counterclockwise in the views of the upper latch assembly of FIGS. 20-22). Therefore, movement of the second linkage 62 in the direction of arrow 360 causes latch 80 to move from the latched to the unlatched position via the sequential movement of the cam 408, intermediate latch 84, and latch 80, as discussed above. With respect to the lower latch assembly, as the second linkage 136 moves in the direction of arrow 360 (e.g., away from the lower latch assembly), the second linkage 236 exerts a force on the cam 430 in the direction of arrow 360. The projection 434 of the second cam 430 thus engages the second projection 412 of the intermediate latch 84 to move the intermediate latch 84 in the first direction (e.g., clockwise in the views of the upper latch assembly of FIGS. 23-24). Therefore, movement of the second linkage 62 in the direction of arrow 360 causes latch 80 to move from the latched to the unlatched position via the sequential movement of the cam 430, intermediate latch 84, and latch 80, as discussed above.

Release of the push button 208 moves the latch 80 of the respective latch assembly from the unlatched position to latched position. Release of the push button 208 (e.g., removable of the force on the push button 208) causes the second linkages 136 to exert a force on the respective cams 408, 434 in the direction opposite of arrow 360 (e.g., toward the respective latch assembly) and the projections 416, 434 thereof to disengage the projections 112, 116 of the intermediate latches 84 to move opposite the first direction. Therefore, movement of the second linkages 136 in the direction of arrow 360 causes latch 80 to move from the latched to the unlatched position via the sequential movement of the cams 408, 434, intermediate latch 84, and latch 80, as discussed above.

Various features and advantages of the invention are set forth in the following claims.

What is claimed is:

1. A door of a vehicle, the vehicle including a vehicle body, the door comprising:

a door body coupled to the vehicle body, the door body defining an interior face and an exterior face, the door body movable relative to the vehicle body between an open position and a closed position;

a latch movable relative to the door body between a latched position and an unlatched position, the latch configured to secure the door body in the closed position when the latch is in the latched position;

an actuator directly on the interior face of the door body and operable to move the latch from the latched position to the unlatched position; and a push button actuator directly on the interior face of the door body, the interior face faces an interior of the vehicle when the door body is in the closed position, and operable to move the latch from the latched position to the unlatched position, wherein the actuator is operable to move the latch from the latched position to the unlatched position without operating the push button actuator, wherein the push button actuator is operable to move the latch from the latched position to the unlatched position without operating the actuator, and wherein the push button actuator is part of a push button actuator assembly including a cam that is operably coupled to the latch, the push button actuator being linearly movable to rotate the cam, wherein rotation of the cam moves the latch from the latched position to the unlatched position.

2. The door of a claim 1, wherein the push button actuator is movable along a first axis to move the cam about a second axis that is perpendicular to the first axis, and wherein movement of the cam causes the latch to move from the latched position to the unlatched position.

3. The door of a claim 1, wherein the cam is operably coupled to the latch by a linkage, the push button actuator being movable along a first axis to move the cam about a second axis that is perpendicular to the first axis, wherein rotation of the cam causes a force along a third axis that is perpendicular to the first axis to be exerted on the linkage to move the linkage along the third axis, causing the latch to move from the latched position to the unlatched position.

4. A door of a vehicle, the vehicle including a vehicle body, the door comprising:

a door body coupled to the vehicle body, the door body defining an interior face and an exterior face, the door body movable relative to the vehicle body between an open position and a closed position;

a latch movable relative to the door body between a latched position and an unlatched position, the latch configured to secure the door body in the closed position when the latch is in the latched position;

an actuator directly on the interior face of the door body and operable to move the latch from the latched position to the unlatched position; and a push button actuator directly on the interior face of the door body, the interior face faces an interior of the vehicle when the door body is in the closed position, and operable to move the latch from the latched position to the unlatched position, wherein the actuator is operable to move the latch from the latched position to the unlatched position without operating the push button actuator, wherein the push button actuator is operable to move the latch from the latched position to the unlatched position without operating the actuator, wherein the push button actuator is part of a push button actuator assembly including a cam having a first portion that is operably coupled to the latch by a linkage and a second portion that is in direct contact with the push button actuator, the push button actuator being linearly movable to rotate the cam, wherein rotation of the cam causes a force to be exerted on the linkage to move the latch from the latched position to the unlatched position.

5. The door of claim 4, wherein the push button actuator is movable between an unactuated position and an actuated position.

6. The door of claim 5, wherein the push button actuator is biased into the unactuated position by a spring, and wherein moving the push button actuator from the unactuated position to the actuated position overcomes the bias of the spring.

7. A door of a vehicle, the vehicle including a vehicle body, the door comprising:

a door body coupled to the vehicle body, the door body movable relative to the vehicle body between an open position and a closed position;

a latch movable relative to the door body between a latched position and an unlatched position, the latch configured to secure the door body in the closed position when the latch is in the latched position;

a first actuator supported by the door body that is accessible from inside the vehicle body when the door body is closed and operable to move the latch from the latched position to the unlatched position; and a second actuator supported by the door body that is accessible from inside the vehicle body when the door body is closed and operable to move the latch from the latched position to the unlatched position, wherein the first actuator is operable to move the latch from the latched position to the unlatched position without operating the second actuator, wherein the second actuator is linearly movable to move the latch from the latched position to the unlatched position without operating the first actuator, and wherein the second actuator is part of an actuator assembly including a cam that is operably coupled to the latch, and wherein the second actuator rotates the cam to move the latch from the latched position to the unlatched position.

8. The door of a claim 7, wherein the second actuator is movable along a first axis to move the cam about a second axis that is perpendicular to the first axis, and wherein movement of the cam causes the latch to move from the latched position to the unlatched position.

9. The door of a claim 7, wherein the cam has a first portion that is operably coupled to the latch by a linkage and a second portion that is in direct contact with the push button actuator, and wherein rotation of the cam causes a force to be exerted on the linkage to move the latch from the latched position to the unlatched position.

10. A door of a vehicle, the vehicle including a vehicle body, the door comprising:

a door body coupled to the vehicle body, the door body movable relative to the vehicle body between an open position and a closed position;

a latch movable relative to the door body between a latched position and an unlatched position, the latch configured to secure the door body in the closed position when the latch is in the latched position;

a first actuator supported by the door body that is accessible from inside the vehicle body when the door body is closed and operable to move the latch from the latched position to the unlatched position; and a second actuator supported by the door body that is accessible from inside the vehicle body when the door body is closed and operable to move the latch from the latched position to the unlatched position, wherein the first actuator is operable to move the latch from the latched position to the unlatched position without operating the second actuator, wherein the second actuator is linearly movable to move the latch from the latched position to the unlatched position without operating the first actuator, and wherein the second actuator is part of an actuator assembly including a cam that is operably coupled to the latch by a linkage, the second actuator being movable along a first axis to move the cam about a second axis that is perpendicular to the first axis, and wherein rotation of the cam causes a force along a third axis perpendicular to the first axis to be exerted on the linkage to move the linkage along the third axis, causing the latch to move from the latched position to the unlatched position.

11. The door of claim 10, wherein the second actuator is movable between an unactuated position and an actuated position.

12. The door of claim 11, wherein the second actuator is biased into the unactuated position by a spring and wherein moving the second actuator from the unactuated position to the actuated position overcomes the bias of the spring.

13. An actuator assembly for use with a door of a vehicle, the vehicle including a vehicle body, the door including a door body coupled to the vehicle body and defining an interior face and an exterior face, the door body movable relative to the vehicle body between an open position and a closed position, a latch movable relative to the door body between a latched position and an unlatched position, the latch configured to secure the door body in the closed position when the latch is in the latched position, the actuator assembly comprising:

an actuator directly coupled to the interior face of the door body and movable along a first axis, the interior face faces an interior of the vehicle body when the door body is in the closed position;

a cam selectively engageable by the actuator, the cam being rotatable about a second axis that is different than the first axis; and a linkage operably coupled between the cam and the latch and movable along a third axis that is different from the first axis and second axis, wherein the actuator is operable to rotate the cam thereby causing a force coincident with the third axis to be exerted on the linkage to move the latch from the latched position to the unlatched position, wherein the cam includes a first portion that is coupled to the linkage and a second portion that is selectively engageable by the actuator, and wherein the first portion extends along a fifth axis and the second portion extends along a sixth axis that is oriented at a non-parallel and non-perpendicular angle relative to the fifth axis.

14. The actuator assembly of claim 13, wherein to move the latch from latched to the unlatched position, the actuator is movable between an unactuated position and an actuated position.

15. The actuator assembly of claim 14, wherein the actuator is biased into the unactuated position by a spring and wherein moving the actuator from the unactuated position to the actuated position overcomes the bias of the spring.

16. The actuator assembly of claim 13, wherein the first axis is perpendicular to the second axis and the third axis.

* * * * *